(12) United States Patent
Kousek et al.

(10) Patent No.: US 7,059,058 B2
(45) Date of Patent: Jun. 13, 2006

(54) ROTATIONAL CONSTRUCTIONAL LASER

(75) Inventors: Heinz Kousek, Feldkirch (AT);
Manfred Ammann, Lauterach (AT);
Hans-Rudolf Ammann, St. Gallen (CH)

(73) Assignee: Hilti Aktiengesellschaft, Schaan (LI)

( * ) Notice: Subject to any disclaimer, the term of this patent is extended or adjusted under 35 U.S.C. 154(b) by 228 days.

(21) Appl. No.: 10/858,025

(22) Filed: Jun. 1, 2004

(65) Prior Publication Data
US 2005/0008043 A1    Jan. 13, 2005

(30) Foreign Application Priority Data
Jun. 6, 2003    (DE) ................. 103 25 859

(51) Int. Cl.
*G01C 5/00*    (2006.01)
(52) U.S. Cl. .................. 33/290; 33/DIG. 21
(58) Field of Classification Search ......... 33/290–292, 33/DIG. 21
See application file for complete search history.

(56) References Cited
U.S. PATENT DOCUMENTS

| | | | | |
|---|---|---|---|---|
| 4,751,782 A | * | 6/1988 | Ammann | ..................... 33/291 |
| 5,572,797 A | * | 11/1996 | Chase | .................. 33/DIG. 21 |
| 5,754,327 A | * | 5/1998 | Masotti et al. | ............... 359/198 |
| 6,082,875 A | * | 7/2000 | Kousek | ........................ 33/291 |
| 6,163,373 A | | 12/2000 | Ohtomo et al. | |
| 6,249,983 B1 | * | 6/2001 | Wright et al. | .................. 33/290 |
| 2002/0083603 A1 | * | 7/2002 | Jang | ............................. 33/281 |
| 2002/0138997 A1 | * | 10/2002 | Ohtomo et al. | ............... 33/290 |
| 2004/0222880 A1 | * | 11/2004 | Lee et al. | .................... 340/431 |
| 2004/0253564 A1 | * | 12/2004 | Cho et al. | .................... 434/136 |

FOREIGN PATENT DOCUMENTS
EP    0854301    1/1998

OTHER PUBLICATIONS
Patent Abstract of Japan, No. 60067812, Apr. 1985.

* cited by examiner

*Primary Examiner*—G. Bradley Bennett
(74) *Attorney, Agent, or Firm*—Abelman, Frayne & Schwab

(57) ABSTRACT

A rotational construction laser includes a housing (17) a laser unit (4) located in the laser housing (17), a device (5) for rotating, at least segmentwise, a laser beam (2) of the laser unit (4) within a rotational plane (R) of a rotational member (6) in which the rotating device (5) is supported for rotational about a rotational axis (A) that intersects a beam axis (S) of the rotatable laser beam (2), and an arrangement for inclinably supporting the rotation axis (A) in at least one pivot plane ($E_1$) and including a mounting frame (3) and a universal ball joint support (7) arranged in the mounting frame (3), with the rotating device (5) being located in a central point (M) of a universal ball joint (8) supported in the universal ball joint support (7).

9 Claims, 2 Drawing Sheets

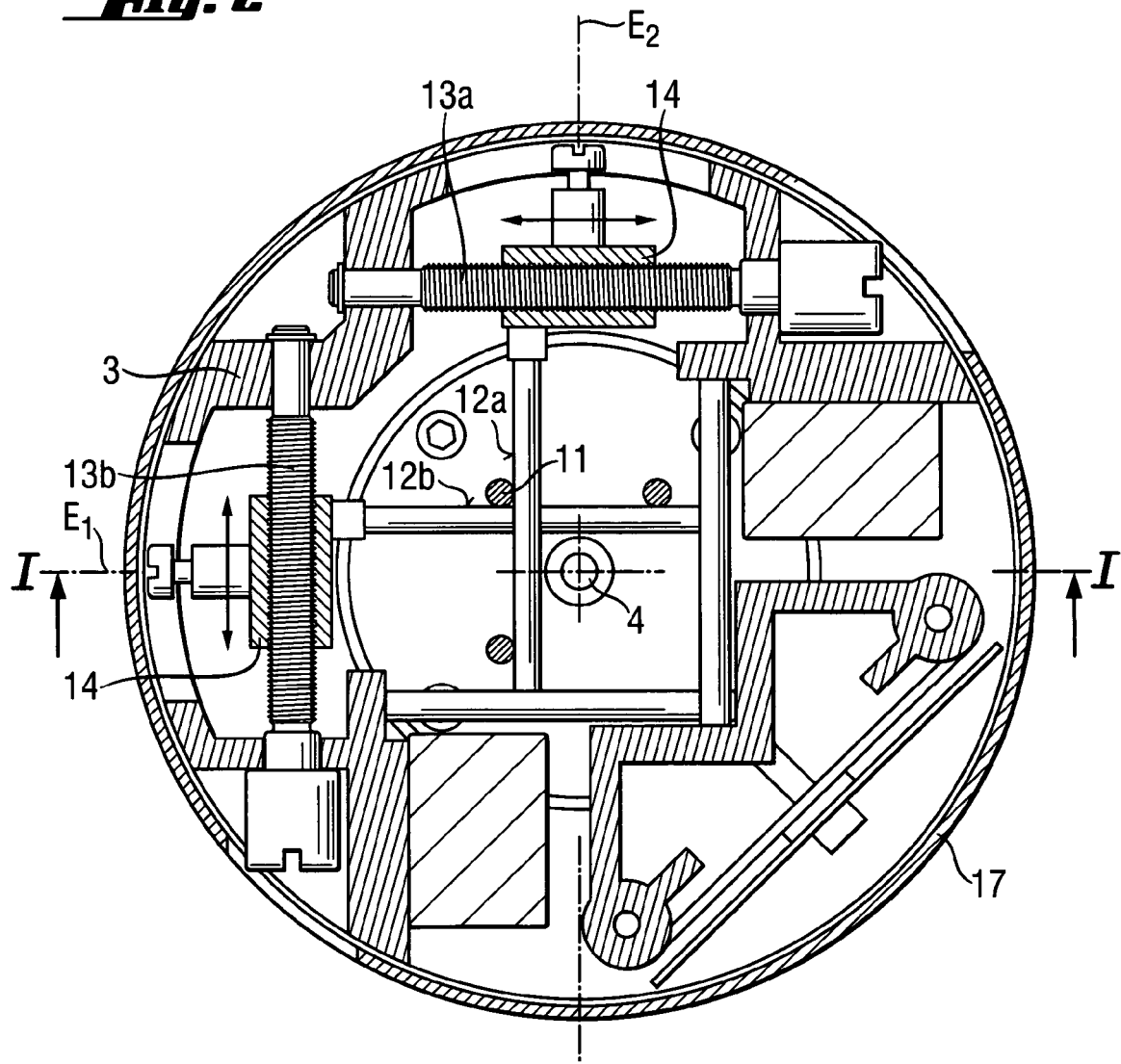

ROTATIONAL CONSTRUCTIONAL LASER

BACKGROUND OF THE INVENTION

1. Field of the Invention

The present invention relates to a rotational constructional laser with at least segmentwise rotatable laser beam.

2. Description of the Prior Act

Rotational constructional lasers with at least segmentwise rotatable laser beam are used primarily in the constructional industry to set horizontal, vertical, or inclined planes on walls, ceilings and floors.

German Publication DE-4406914 discloses a rotational constructional laser having a laser unit arranged in a mounting frame and a laser beam of which is rotated by a rotating device by about 90°. The rotating device is supported for rotation about a rotational axis in a rotational member. The rotational axis intersects the beam axis of the laser beam, whereby the rotational plane can be arbitrary pivoted in a pivot plane, which extends perpendicular to the rotational plane, about a pivot axis.

European Publication EP-854351 discloses a rotational constructional laser in which the rotational plane of the laser beam can be inclined in two mutually perpendicular pivot planes, with the rotational axis, which is inclinably supported in a universal ball joint support in a mounting frame, being inclined, together with the laser unit and the rotating device, with respect to at least horizontally extending housing by two adjustment drives. An arch of the inclination angle, which is described upon inclination of the rotating device, leads to an affine displacement error of the rotational plane, which requires, in particular or large inclination angles, a subsequent adjustment of the rotational constructional laser. Moreover, because of this inclination angle arch, an increased space is needed, which results in an increased size of the housing.

Accordingly, an object of the present invention is to provide a rotational constructional laser in which the inclination of the inclinable rotational plane relative to the housing does not lead to a displacement error.

Another object of the present invention is to provide a rotational constructional laser with a reduced-size housing.

SUMMARY OF THE INVENTION

These and other objects of the present invention, which will become apparent hereinafter, are achieved by providing a rotational constructional laser having a housing, a laser unit located in the housing, a device for rotating, at least segmentwise, a laser beam of the laser unit within a rotational plane, a rotational member for receiving the rotating device which is supported for rotation about a rotational axis that intersects a beam axis of the rotatable laser beam, and elements for inclinably supporting the rotational axis in at least one pivot plane and including a mounting frame and a universal ball joint support arranged in the mounting frame with the rotating device being located in a central point of a universal ball joint supported in the universal ball joint support.

With the arrangement of the rotating device in the center of a universal ball joint, an inclination of the rotational plane always leads to a point rotation which eliminates the affine displacement error. The stationary, with respect to the location, arrangement of the rotating device eliminates the need in an additional space required by the inclination angle arch and, as a result, the size or volume of the housing can be reduced.

Advantageously, the rotational member is supported in a pivot support provided in ball bearing of a stator member which is fixedly connected with the universal ball joint. As a result, the rotation of the rotating device about the rotational axis is separated from the inclination of the rotational axis, with the stator member being secured to the mounting frame without a possibility of rotation relative thereto.

Advantageously, the stator member is guided over the mounting frame with an aid of at least one inclination guide element, whereby acceptable inclination planes, stationary relative to the housing, are determined.

Advantageously, the at least one inclination guide element is formed as a guided rod guided over an inclination guide profile of the mounting plane. The point of the one-sided contact of the at least one inclination guide element with the inclination guide profile, together with the center point of the universal ball joint, determine a direction that is used for securing the acceptable inclination planes, in particular, together with a further guide element, which contacts the inclination guide profile at a further point.

Advantageously, the two inclination guide elements are guided over two inclination guide profiles provided in the mounting frame and extending perpendicular to each other. Thereby, during the inclination of the rotational axis, the correspondence to the Cartesian coordinate system, fixed with respect to the housing, is retained. In addition, the alignment of the inclination sensor, which is preferably arranged in the stator member, is also retained.

Advantageously, there are provided inclination adjustment elements which inclinably connect the stator member with the housing, whereby the inclination of the stator member relative to the housing can be adjusted.

Advantageously, the inclination adjustment element is formed as a threaded rod extending through an adjustment nut provided on the mounting frame. The inclination adjustment element insures a precise self-looking adjustment of the inclination.

Advantageously, these are provided two inclination adjustment elements which are arranged in a mounting frame perpendicular to each other, whereby the rotational axis can be separately inclined in any of the two mutually perpendicular inclination planes.

Advantageously, the stator member is fixedly connected with an electric motor and is fixedly aligned, thereby, with respect to the rotational axis, which permits to use a simple rotary drive.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWING

The drawings show:

FIG. 2 a cross-sectional view along line II—II in FIG. 1.

DETAILED DESCRIPTION OF THE PREFERRED EMBODIMENT

Figure 1:
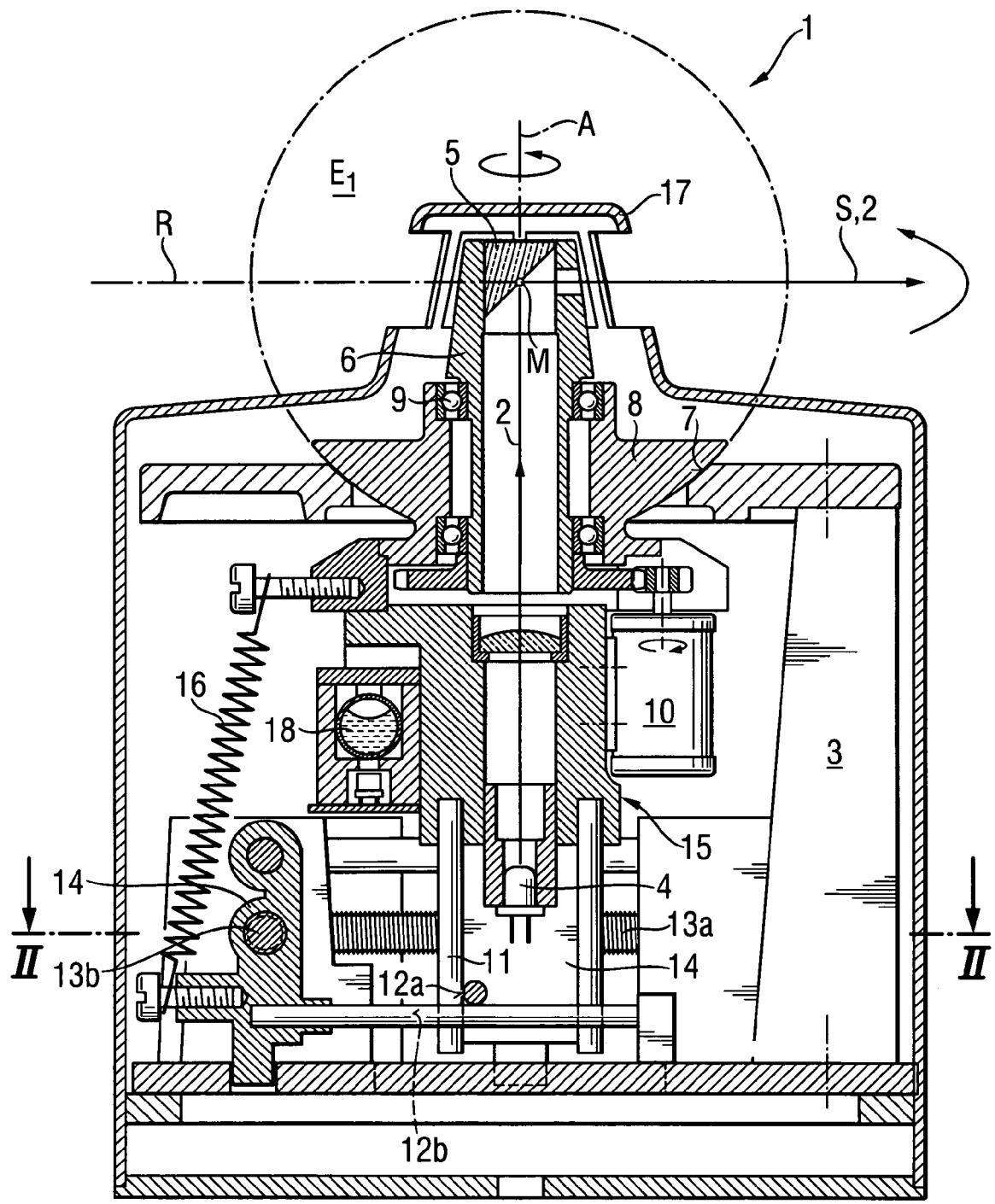
FIG. 1 a longitudinal cross-sectional view along line I—I in FIG. 2 of a rotational constructional laser according to the present invention.

A rotational constructional laser 1 according to the present invention, which is shown in FIG. 1, includes a housing 17, a laser unit 4, and a rotating device 5 which rotates segmentwise a laser beam 2 of the laser unit 4 about a beam axis S that lies in a rotational plane R. The rotating device 5 is located in a rotational member 6 and is supported for rotation about a rotational axis A that intersects the beam axis S of the rotatable laser beam 2 in a center point M. The rotational axis A of the rotational member 6 is inclinably supported in a mounting frame 3, which is fixedly secured in the housing 17, in a pivot plane E, (which is the plane of the drawing) extending perpendicular to the rotational plane R, within a universal ball joint support 7. The rotating device 5 is located, thus, in a fictitious center point M of a universal ball joint 8 supported in the universal ball joint support 7. The rotational member 6 is supported in a pivot support 9 of a stator member 15 which is fixedly connected with the universal ball joint 8 and an electric motor 10. The stator member 15 is fixedly connected with inclination guide elements 11 which provide for a formlocking displacement of the stator member 15, together with an integrated therein, inclination sensor 18, along two inclination guide profiles 12a, 12b, respectively, which are arranged perpendicular to each other in the mounting frame 3. The stator member 15 is biased against the inclination guide profiles 12a, 12b by a spring 16.

According to FIG. 2, the stator member 15, which is located above the plane of the drawing, is formlocking by displaceable along the inclination guide profiles 12a, 12b, which are formed as rails, with the aid of the inclination guide elements 11 which are formed as guide rods and which contact respective inclination guides 12a, 12b at two points. The inclination guide elements 11 provide for inclination of the stator member 15 in tow mutually perpendicular planes $E_1$ and $E_2$ The stator member 15 is also connected with the mounting frame 3 by two, perpendicular to each other, inclination adjustment elements 13a, 13b arranged in the mounting plane 3. The inclination adjustment elements 13a, 13b are formed as threaded rods extending through respective controllably driven adjustment nuts 14.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A rotational constructional laser, comprising a housing (17); a laser unit (4) located in the housing (17); a device (5) for rotating, at least segmentwise, a laser beam (2) of the laser unit (4) within a rotational plane (R); a rotational member (6) for receiving the rotating device (5) which is supported for rotation about a rotational axis (A) of the rotational member (b) and that intersects a beam axis (5) of the rotatable laser beam (2); and means for inclinably supporting the rotational axis (A) in at least one pivot plane ($E_1$) and including a mounting frame (3) and a universal ball joint support (7) arranged in the mounting frame (3), the rotating device (5) being located in a central point (M) of a universal ball joint (8) supported in the universal ball joint support (7).

2. A rotational constructional laser according to claim 1, wherein the rotational member (6) is supported in a pivot support provided in (9) a stator member (15) which is fixedly connected with the universal ball joint (8).

3. A rotational constructional laser according to claim 2, comprising at least one inclination guide element (11) for guiding the stator member (15) along an inclination guide profile (12a) of the mounting frame (3).

4. A rotational constructional laser according to claim 3, wherein the at least one inclination guide element (11) is formed as a guide rod.

5. A rotational constructional laser according to claim 3, comprising a further guide element (11) for guiding the stator member along a further inclination guide profile (12b) of the mounting frame (3) extending perpendicular to the least one inclination guide profile (12a).

6. A rotational constructional laser according to claim 3, comprising at least one inclination adjustment element (13a) for inclinably connecting the stator member (15) with the mounting frame (3).

7. A rotational constructional laser according to claim 6, wherein the at least one inclination adjustment element (13a) is formed as a threaded rod extending through an adjustment nut (14) supported in the mounting frame (3).

8. A rotational constructional laser according to claim 6, comprising a further inclination adjustment element (13b) for inclinably connecting the stator member (15) with the mounting frame (3) and extending perpendicular to the at least one inclination adjustment element (13a).

9. A rotational constructional laser according to claim 2, wherein the stator member (15) is connected with an electromotor (10).

* * * * *